United States Patent [19]
Urbach

[11] 3,852,032
[45] Dec. 3, 1974

[54] PROCESS FOR STERILIZING HYDROPHILIC GELATIN LENSES HAVING ULTRAVIOLET STABILIZERS

[75] Inventor: Jacques Urbach, North Hollywood, Calif.

[73] Assignee: Uroptics International Incorporated, Los Angeles, Calif.

[22] Filed: May 7, 1973

[21] Appl. No.: 358,058

Related U.S. Application Data

[62] Division of Ser. No. 150,358, June 7, 1971, abandoned.

[52] U.S. Cl. ............ 21/54 R, 21/DIG. 2, 21/102 R, 351/163
[51] Int. Cl. .......................... A61l 1/00, G02c 13/00
[58] Field of Search .......... 21/DIG. 2, 54 R, 102 R; 134/25 A; 351/160, 162, 163; 294/1 CA; 206/5 A

[56] References Cited
UNITED STATES PATENTS

| | | | |
|---|---|---|---|
| 3,171,869 | 3/1965 | Weinberg | 351/162 UX |
| 3,177,874 | 4/1965 | Spriggs | 294/1 CA X |
| 3,447,892 | 6/1969 | Watson et al. | 21/102 R X |
| 3,504,683 | 4/1970 | Timmer et al. | 134/25 A X |
| 3,519,462 | 7/1970 | Bristol et al. | 117/33.3 |

FOREIGN PATENTS OR APPLICATIONS

1,197,161   7/1970   Great Britain ..................... 206/5 A

OTHER PUBLICATIONS

Boucher, "Advances in Sterilization Techniques," Am. J. Hospital Pharmacy, Vol. 29, pp. 665-666, (1972).

Encyclopedia of Polymer Science and Technology, Vol. 14, pp. 125-127, 139-143, (1972).

*Primary Examiner*—Barry S. Richman
*Assistant Examiner*—Timothy W. Hagan
*Attorney, Agent, or Firm*—Howard A. Silber

[57] ABSTRACT

Process and apparatus for sterilization of soft contact lenses by periodic, controlled exposure to germicidal ultraviolet radiation. An ultraviolet stabilizer is included in the hydrophilic gel material of the contact lens to prevent degradation thereof as a result of the UV exposure.

4 Claims, 3 Drawing Figures

PATENTED DEC 3 1974 3,852,032

JACQUES URBACH
INVENTOR.

BY
Flam & Flam
ATTORNEYS

PROCESS FOR STERILIZING HYDROPHILIC GELATIN LENSES HAVING ULTRAVIOLET STABILIZERS

This application is a division of Ser. No. 150,358, filed June 7, 1971, now abandoned.

BACKGROUND OF THE INVENTION

1. Field of the Invention

This invention relates to plastic contact lenses and more particularly to hydrated gel lenses containing certain interrelated molecular interfacings producing characteristics for absorption, transferring, reduction, etc., of UV so as to substantially improve the intrinsic stability of the polymer used.

2. Description of the Prior Art

It has been the conventional practice to use hard and soft contact lenses for the promotion of eyesight correction and other uses relating to the eyes. The chief difference between the conventional hard lenses and the soft or hydrophilic gel lenses is the marked increase in polar or water attracting centers in the latter material. The soft contact lenses require cleaning which necessitates that the lenses be kept moist and preferably in a saline solution. Should the soft and pliable plastic contact lens be left out of such a solution, the lens becomes hard, brittle and cracks.

However, it has been found that in the usual practice of cleaning soft plastic lenses, bacteria tends to grow on the lens when in the saline solution due to the presence of minute pores in the surface of the lens. These pores become centers for culture media. Various methods are currently employed to care for hydrophilic gel lenses that include methods or means for reducing or killing the growth of bacteria. For example, the lenses may be submerged in a saline solution and boiled for 10 minutes at 100° C. Also, the lenses may be treated with three percent hydrogen peroxide for 5 to 10 minutes followed by a saline-bicarbonate rinse. Obviously, the first method is extremely time consuming and tedious, while in practicing the second method it is possible to damage the eyes should the peroxide not be thoroughly removed by the bicarbonate soda rinse. Even when using a commercial liquid cleaning and bacterial retardant, it has been found that a thin residual film remains on the lens after the cleaning procedure.

Therefore, a long standing need has existed to provide a means and method for cleaning and killing of bacteria on soft lenses such as hydrophilic gel lenses which is inexpensive and that will not leave residual film and other material on the lenses after the procedure.

SUMMARY OF THE INVENTION

Accordingly, the above mentioned problems and difficulties are obviated by the present invention which provides a novel contact lens incorporating ultraviolet stabilizers confined in the base polymer whereby the lens may be readily subject to ultraviolet radiation for killing various forms of bacteria. Embrittlement of the lens and eventual disintegration of the lens material is avoided when the lens is subjected to ultraviolet radiation due to the presence of the stabilizer.

The ultraviolet stabilizers in the material of the lenses may take the form of means for absorbing most of the incident UV light and dissipate the associated energy in a harmless manner. In this instance, the compound protects the polymer by competetive absorption of UV light. Products that protect in this manner are commonly referred to as UV absorbers or Uv screening agents. Another means is to remove the energy that the polymer has absorbed before photochemical degradation can take place. Products that protect in this manner may be referred to as either energy transfer agents or as excited state quenchers.

Therefore, it is among the primary objects of the present invention to provide a novel contact lens that will readily accept ultraviolet radiation without encountering adverse effects of material degradation by way of embrittlement or disintegration.

Another object of the present invention is to provide a novel contact lens having ultraviolet stabilizers incorporated into the base material for reducing or eliminating the adverse effects of ultraviolet radiation upon the polymer material of the lens.

Another object of the present invention is to provide a novel means for killing or retarding bacterial growth on the surfaces of contact lenses that is relatively simple, inexpensive and convenient.

Yet another object of the present invention is to provide a means for sterilizing hydrophilic gel lenses by the use of ultraviolet radiation by incorporating ultraviolet stabilizers within the polymer so as to avoid damage to the polymer when subjected to the radiation.

A further object of the present invention is to provide a novel means for protecting the material of hydrophilic gel lenses when subjected to ultraviolet radiation for the purpose of reducing bacterial growth thereon which includes the incorporation of ultraviolet stabilizers in the form of UV absorbers, UV screening agents or energy transfer agents that are molecularly carried in the polymer.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

DESCRIPTION OF THE PREFERRED EMBODIMENT

Figure 1:
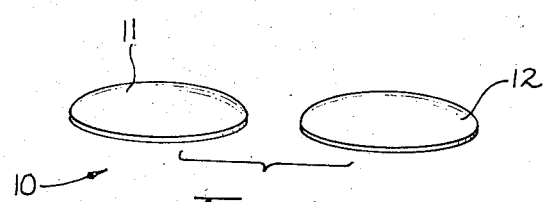
FIG. 1 is a perspective view of a pair of hydrophilic gel lenses incorporating the ultraviolet stabilizers of the present invention.

Referring now to FIG. 1, a pair of contact lenses are indicated in the general direction of arrow 10 and include a lens 11 for the right eye and a lens 12 for the left eye. Each of the lenses is of the hydrophilic gel material and which is considered to be soft, pliable and resilient. The hydrated gel lenses may contain the following materials; hydroxyethylmethacrylate (HEMA) or its analogues; ethyleneglycoldimethacrylate (EGMA) or its analogues; polymethyl methacrylate (PMMA) or its analogues; or polyvinylpyrrolidone (PVP).

Figure 2:
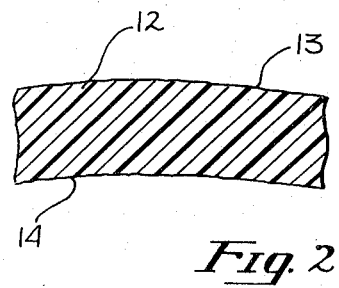
FIG. 2 is a greatly enlarged fragmentary section of one of the lenses shown in FIG. 1 illustrating the porosity of the optically smooth lens surface conducive to bacterial growth.
Figure 3:
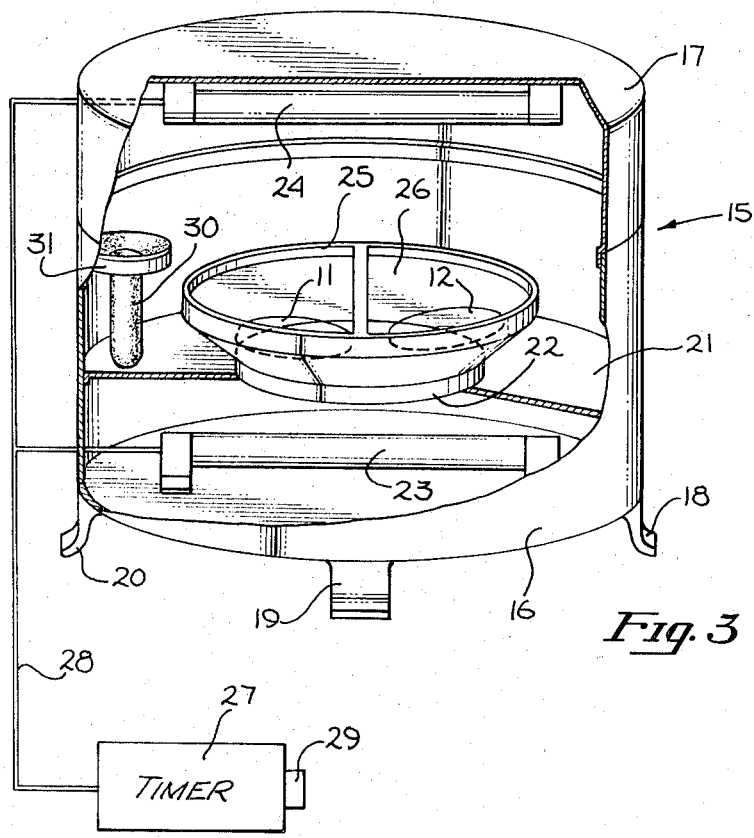
FIG. 3 is a cross sectional view of an ultraviolet radiation cleaning device for the lenses shown in FIG. 1.

Referring to FIG. 2, a greatly enlarged fragmentary sectional view is shown of one of the lenses such as lens 12. It can be seen that the optically smooth surfaces 13 and 14 of the lens are porous and minutely irregular. It is in the valleys of the irregular surface areas that water gathers and bacterial growth is promoted. To rid or eliminate bacteria and the promotion of its growth, ultraviolet radiation may be employed for sterilization purposes. Ultraviolet radiation above 200 nm does not impart taste, odor or produce chemical changes in the collected water. Sterilization of these lenses implies that all life, that is, bacteria, mold, virus, algae, protozoa are destroyed. Each organism must absorb a specific amount of UV energy before this can be accomplished. A discussion of a device for subjecting lenses 11 and 12 to ultraviolet radiations for a predetermined period of time is shown in FIG. 3 and is indicated by reference numeral 15. This device will be discussed in detail later.

Plastics, like many other organic materials, are degraded by exposure to the high-energy solar radiation occurring in the ultraviolet region of the spectrum, that is, ultraviolet light of wavelengths from about 290 mu, the cut-off point of the atmosphere, to 400 mu. The energy content of light in this region ranges from 71.5 kilocalories per mole to somewhat over 95 kilocalories per mole, which is sufficient to break most bonds in organic molecules. In the case of plastics for contact lenses, this results in various changes such as crazing, chalking, discoloration, loss of gloss, reduction in electrical properties, or lowered physical properties such as tensile strength and elongation. Ultimately, embrittlement usually occurs and the material may disintegrate completely.

The intrinsic stability of a particular polymer depends on the amount of UV light absorbed and on the method by which the absorbed energy is dissipated. There are several ways in which this energy may be transformed: (1) Heat — An excited-state molecule converts the excitation energy into vibrational energy that is then passed on to the surroundings as heat. (2) Luminescence — The excited molecule emits radiation of a wavelength usually slightly longer than that of the exciting radiation (fluorescence). If there is a time lag in this reradiation, the phenomenon is known as phosphorescence. (3) Chemical transformation — The molecule retains the absorbed energy until it can be used chemically by combination with some other molecule to produce a photochemical change. (4) Energy transfer — The excitation energy may be transferred to another molecule. (5) Dissociation — The molecule may break down into smaller parts.

While some polymers such as polymethyl methacrylate and polyvinyl fluoride are very resistant to light degradation, others, such as unprotected polypropylene, deteriorate very rapidly. One of the best ways to control UV light-induced degradation of plastics is through use of ultraviolet stabilizers.

There are two main ways in which a compound may act as a stabilizer to prevent polymer degradation by UV light: (1) It may preferentially absorb most of the incident UV light and dissipate the associated energy in a harmless manner. In this case, the compound protects the polymer by competitive absorption of UV light. Products that protect in this manner are commonly referred to as UV absorbers or UV screening agents. (2) It may remove the energy that the polymer has absorbed before photochemical degradation can take place. Products that protect in this manner may be referred to either as energy transfer agents or as excited state quenchers.

While most of the common UV stabilizers are primarily absorbing agents, a few, particularly complexes of nickel or other heavy metals, act as energy transfer agents.

The basic requirements of a good UV stabilizer are as follows: (1) The product itself must exhibit long-term stability toward ultraviolet light. (2) It must dissipate absorbed energy in such a manner as to cause no degradation or color development in the plastic, and it must not sensitize the substrate. (3) It must be compatible with the plastic to be stabilized during processing and also on exposure. (4) It should be relatively non-toxic. (5) It must impart little or no color to the plastic material at the normal use level. (6) It should be resistant to water or cleaning solvents in certain applications. (7) And, finally, the UV stabilizer must be reasonably priced.

A variety of UV stabilizers are commercially available such as: Benzophenones that are derivatives of 2-hydroxybenzophenone are available with a wide variety of substituents on the basic molecule to provide proper compatibility, volatility and absorption properties for a considerable range of different applications. They protect mainly by the competive absorption of UV light. Typical benzophenones available commercially are: 2-hydroxy-4-methoxybenzophenone, 2-hydroxy-4-octyloxybenzophenone, 4-dodecyloxy-2-hydroxybenzophenone, 2,2-dihydroxy-4-methoxybenzophenone and 2,2'-dihydroxy-4, 4'dimethoxybenzophenone. Benzotriazoles that are derivatives of 2-2(2'-hydroxyphenyl) benzotriazole act primarily as UV absorbers. Typical examples are 2-(2'-hydroxy-5'-methylphenyl) benzotriazole and 2-(3'-tertiarybutyl-2'-hydroxy-5'-methylphenyl-5-chlorobenzotriazole. Substituted acrylates absorb UV light primarily in the 300- to 320-mu region of the spectrum. Typical examples include ethyl-2-cyano-3,3-diphenylacrylate and methyl-2-carbomethoxy-3-(paramethoxyphenyl) acrylate. Aryl esters include aryl salicylates and esters of resorcinol. Typical examples are phenyl salicylate, p-tert-octylphenyl salicylate and resorcinol monobenzoate. Compounds of this type undergo a photochemical rearrangement into derivatives of 2-hydroxybenzophenone when exposed to UV light, and nickel-containing compounds are mainly nickel salts or complexes of thiobisphenols, dithiocarbamates or phosphonates. Recent evidence indicates that one of these classes, the thiobis (p-tert-octylphenol) nickel complexes, act as energy transfer agents and stabilize the polymer by removing energy from the polymer molecules that have already absorbed UV light.

In the fabrication and manufacture of a soft gel contact lens which includes UV stabilizers and absorbers, it is preferred first to distill the material such as HEMA so as to remove all hydroquinone from the monomer. Next, the distilled HEMA is mixed with a cross-linking agent wherein one suitable agent is K90-PVP. The mixture is 100% distilled HEMA with 5% K-90 by weight. To this mixture, is added 5% hydroxyethyl methacralate by weight of HEMA as an additive for dimensional stability. To this mixture is added the UV absorber which may be selected from those mentioned above. After mixing the distilled HEMA with the cross-linking agent by any suitable means such as using nitrogen to force the mixture through a filtering unit, the mixture is then cured. Curing may be achieved by placing the mixture in a preheated oven to 96°C. The mixture is placed in molds and is cured at this temperature for about 25–30 minutes. After curing, the contact lens blanks have hardened to approximately a rockwell hardness of 90.

In fabricating the contact lens blanks, the lens blank is initially cut to mm. over desired final lens diameter. The base curve is cut according to standard procedures and cutting one to 2 mm. at a time. After cutting and polishing, the lens is ready for use.

As discussed earlier, sterilization and cleansing of the hydrophilic gel lenses is achieved in accordance with the present invention by subjecting the lenses to ultraviolet radiation. Both the intensity and time for applying the radiation are critical not only for protection of the polymer material itself but to insure that a variety of bacteria, mold, viruses and the spores attendant thereto are thoroughly killed. To this end, a UV radiation device is indicated in the general direction of arrow 15 in FIG. 3 which includes a housing having a base portion 16 and a cover or lid portion 17. The base is provided with legs 18, 19 and 20 for supporting the device on a working surface. A transverse partition 21 divides the hollow interior of the housing into an upper and a lower chamber. The lower chamber is defined by the opposing surfaces of partition 21 and the bottom of base portion 16 while the upper chamber is defined by the opposing surfaces of partition 21 and the cover 17. Partition 21 is also provided with a central opening into which a quartz platform 22 is suitably mounted. The quartz platform 22 may be readily carried on the bottom of a dish 25 having a continuous sidewall for holding a saline solution 26. The pair of contact lenses 11 and 12 are submerged within the saline solution within the dish so as to be disposed between ultraviolet radiation tubes 23 and 24. Tube 23 is suitably mounted on the bottom of base portion 16 within the lower cavity while tube 24 is supported on cover 17 within the upper cavity or chamber. Radiation emitted from tubes 23 and 24 is directed to the dish and to the pair of hydrophilic gel contact lenses submerged in the saline solution.

A short time exposure at high intensity is as effective for destroying or reducing bacterial growth as a long time exposure at low intensity provided the product of the time and intensity are the same. The amount of energy available to an organism from a given ultraviolet source is dependent upon the ultraviolet transmission of water, or in the present instance, the saline solution. The greater the amount of energy absorbed by the water, the less there will be available to destroy the organisms. To provide the proper balance of time and energy level, the present invention includes a timer 27 suitably connected to the UV radiation devices or tubes 23 and 24 via cable 28. Upon depression of a switch 29, the timer is activated so as to supply operating energy to the tubes 23 and 24. When the set time has elapsed, the time will open the circuit to deenergize the tubes and therefore terminate continued radiation.

After the proper time and intensity of radiation has been applied to the lenses, the cover may be removed and the lenses taken from the dish 25 for use.

In order to readily move the lenses 11 and 12 to and from dish 25, the device 15 includes a resilient suction device 30 that may readily held by the fingers, depressed so as to create a suction or slight vacuum that will hold one of the lenses against the tip of the device 30. Once the device is so held, the user can move the lens from one place to another without touching the lens or dropping it. The lens holder 30 is removably supported on a mounting ring 31 so that the device is available for use in a convenient manner. For the purposes of the present invention, it is to be understood that other lifting or holding devices may be employed other than the suction device 30 as shown.

In view of the foregoing, it can be seen that the hydrophilic gelatin lens of the present invention which incorporates the ultraviolet stabilizers, will readily accept ultraviolet radiation without suffering the disadvantages of material degradation and disintegration. By incorporating ultraviolet stabilizers into the molecular structure of the material, the contact lenses may be subjected to ultraviolet rays at given intensities and for specified lengths of time so that the material is protected and the bacterial growths retarded or eliminated. The device 15 ensures that the lenses will be thoroughly saturated or exposed to ultraviolet radiation for given times and intensities required.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A process for the control of bacterial and other organic growth on soft contact lenses formed of hydrophilic gel material, comprising:
   combining an ultraviolet stabilizer with the hydrophilic gel material, of said contact lens, and
   periodically exposing said lens to ultraviolet radiation of sufficient intensity and duration to kill or retard said bacterial and other organic growth, the presence of said ultraviolet stabilizer preventing degradation of said lens as a result of said exposure.

2. The invention as defined in claim 1 wherein said stabilizer comprises an ultraviolet absorber having characteristics of preferential absorption of ultraviolet light and dissipation of the associated energy in a manner harmless to said hydrophilic gel.

3. The invention as defined in claim 1 wherein said stabilizer comprises energy transfer agents having characteristics of removing the associated energy that said hydrophilic gel has absorbed before photochemical degradation can take place.

4. The invention as defined in claim 1 wherein said ultraviolet stabilizer is selected from the group consisting of benzophenones; benzotriazoles; substituted acrylates; aryl esters; and nickel-containing compounds.

* * * * *